United States Patent
Galicia Badillo

(10) Patent No.: US 9,550,450 B2
(45) Date of Patent: Jan. 24, 2017

(54) EXIT WARNING SYSTEM FOR A MOTOR VEHICLE HAVING A SLIDING DOOR

(71) Applicant: FORD GLOBAL TECHNOLOGIES, LLC, Dearborn, MI (US)

(72) Inventor: Juan Manuel Galicia Badillo, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/600,938

(22) Filed: Jan. 20, 2015

(65) Prior Publication Data

US 2016/0207448 A1    Jul. 21, 2016

(51) Int. Cl.
*B60Q 1/26* (2006.01)
*B60Q 1/32* (2006.01)
*B60J 5/06* (2006.01)
*G08B 23/00* (2006.01)

(52) U.S. Cl.
CPC ............ *B60Q 1/323* (2013.01); *B60J 5/06* (2013.01); *B60Q 2400/50* (2013.01)

(58) Field of Classification Search
CPC .................................................. B60Q 1/323
See application file for complete search history.

(56) References Cited

U.S. PATENT DOCUMENTS

| | | |
|---|---|---|
| 1,727,838 A | 10/1929 | Miyaoka |
| 7,068,160 B2 | 6/2006 | Tourneur et al. |
| 7,416,320 B2 | 8/2008 | Sakiyama |
| 2009/0013922 A1* | 1/2009 | Lin .................... B60Q 1/38 116/28 R |
| 2009/0051517 A1* | 2/2009 | Suzuki ................ B60Q 1/323 340/438 |

FOREIGN PATENT DOCUMENTS

| | | |
|---|---|---|
| DE | 102010054921 A1 | 6/2012 |
| FR | 2728210 A1 | 6/1996 |
| FR | 2823477 A1 | 10/2002 |
| JP | 2007190990 A | 2/2007 |

OTHER PUBLICATIONS

English machine translation of the description for FR2728210.
English machine translation of the description for JP2007190990.
English machine translation of the description for FR2823477.
English machine translation of the description for DE102010054921.

* cited by examiner

*Primary Examiner* — Erin File
(74) *Attorney, Agent, or Firm* — Jason Rogers; King & Schickli, PLLC

(57) ABSTRACT

An exit warning system is provided for a motor vehicle having a sliding door. That exit warning system includes a sliding door status sensor, a projector and a warning signal. The warning signal is projected by the projector onto pavement laterally adjacent a motor vehicle when the sliding door is opened in order to warn oncoming drivers that someone could potentially be leaving the vehicle through the open sliding door.

9 Claims, 4 Drawing Sheets

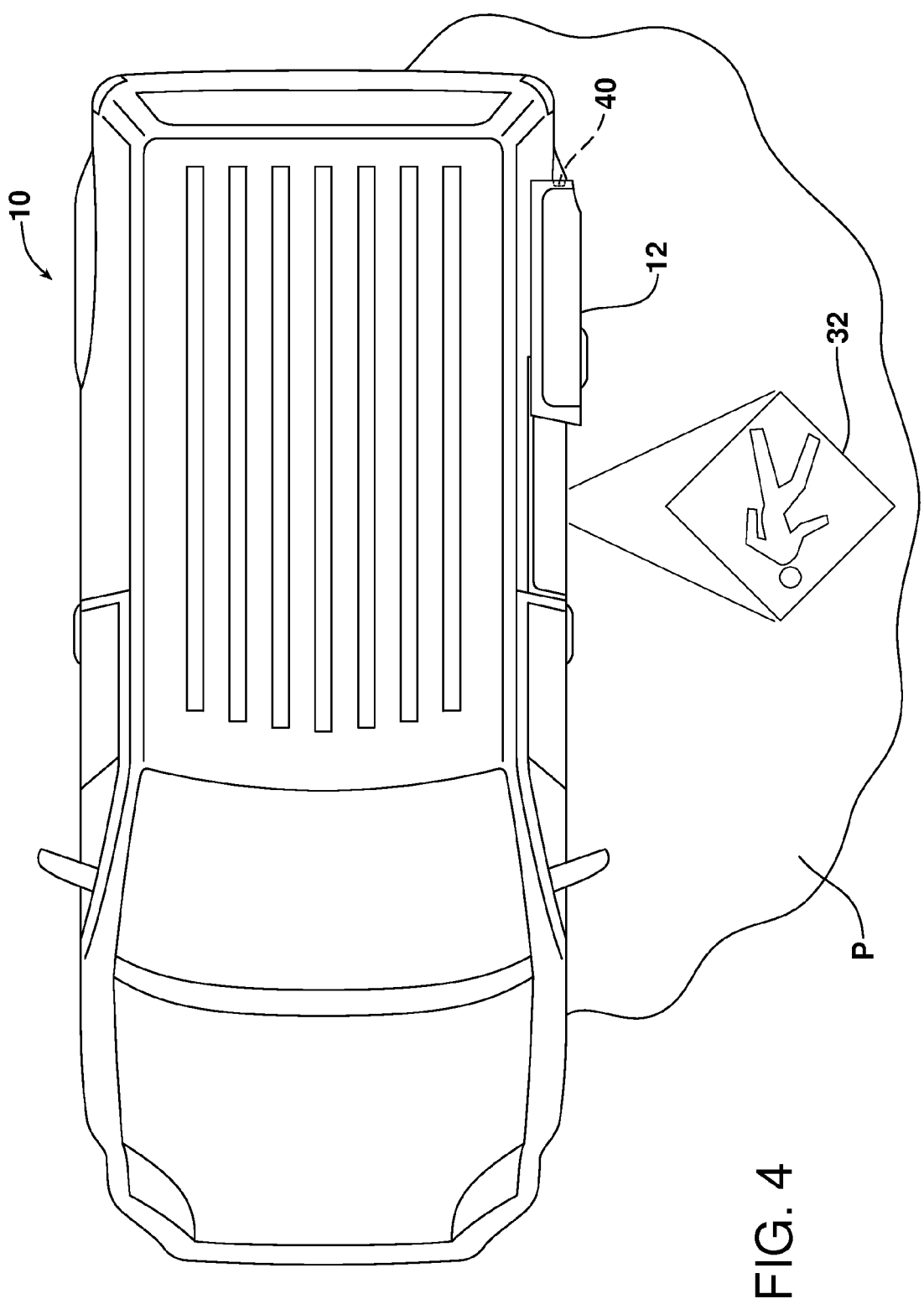

EXIT WARNING SYSTEM FOR A MOTOR VEHICLE HAVING A SLIDING DOOR

TECHNICAL FIELD

This document relates generally to the motor vehicle equipment field and, more particularly, to an exit warning system for a motor vehicle having a sliding door.

BACKGROUND

Sliding doors are becoming increasingly popular on motor vehicles. Sliding doors have a number of benefits over doors mounted on hinges. First they provide a large opening that is unobstructed by the door. Second, the sliding door may be fully opened even when there is an obstacle near the vehicle that would limit the opening of a hinged door.

As sliding doors have become more popular, more and more motor vehicles are being provided with sliding doors on the driver's side of the vehicle. When a vehicle is parked at night and an individual is getting out of the vehicle through a sliding door on the driver's side, that individual will be getting out in the path of moving traffic. This document describes a new and effective exit warning system that provides a signal to an approaching driver that warns of the potential of an individual leaving the parked vehicle through a sliding door.

SUMMARY

In accordance with the purposes and benefits described herein, an exit warning system is provided for a motor vehicle having a sliding door. That exit warning system may be broadly described as comprising a sliding door status sensor, a projector and a warning signal. The warning signal is projected by the projector onto pavement laterally adjacent the motor vehicle when the sliding door is opened.

In one possible embodiment, the warning signal is an icon. In another possible embodiment, the icon is an animated image.

More specifically, the exit warning system includes a controller. That controller is configured to activate that projector to project the warning signal upon receiving a signal from the sliding door status sensor indicating that the sliding door is opened.

In one possible embodiment, the exit warning system further includes an actuator. That actuator is connected to the controller for manually activating and deactivating the projector.

In yet another possible embodiment, the exit warning system includes a speed sensor. The controller is configured to deactivate the projector upon receiving a signal from the speed sensor indicating that the motor vehicle is exceeding a threshold ground speed.

In accordance with an additional aspect, a method is provided of alerting a driver of a first vehicle to a potential of an individual exiting an open sliding door of a second vehicle. That method may be broadly described as comprising projecting a warning signal onto pavement beside the second vehicle outside the open sliding door.

In one possible embodiment, the method further includes the step of using an icon as the warning signal. In another possible embodiment the method further includes using an animated icon as the warning signal.

In some embodiments, the method further includes detecting the opening of the sliding door before projecting the warning signal onto the pavement. Further, in some possible embodiments, the method includes confirming the second vehicle is stationary before projecting the warning signal onto the pavement.

In the following description, there are shown and described several preferred embodiments of the exit warning system. As it should be realized, the exit warning system is capable of other, different embodiments and its several details are capable of modification in various, obvious aspects all without departing from the exit warning system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the exit warning system and together with the description serve to explain certain principles thereof. In the drawing figures:

FIG. 4 is a schematic block diagram of the exit warning system including the controller.

Reference will now be made in detail to the present preferred embodiments of the exit warning system, examples of which are illustrated in the accompanying drawing figures.

DETAILED DESCRIPTION

Figure 1:
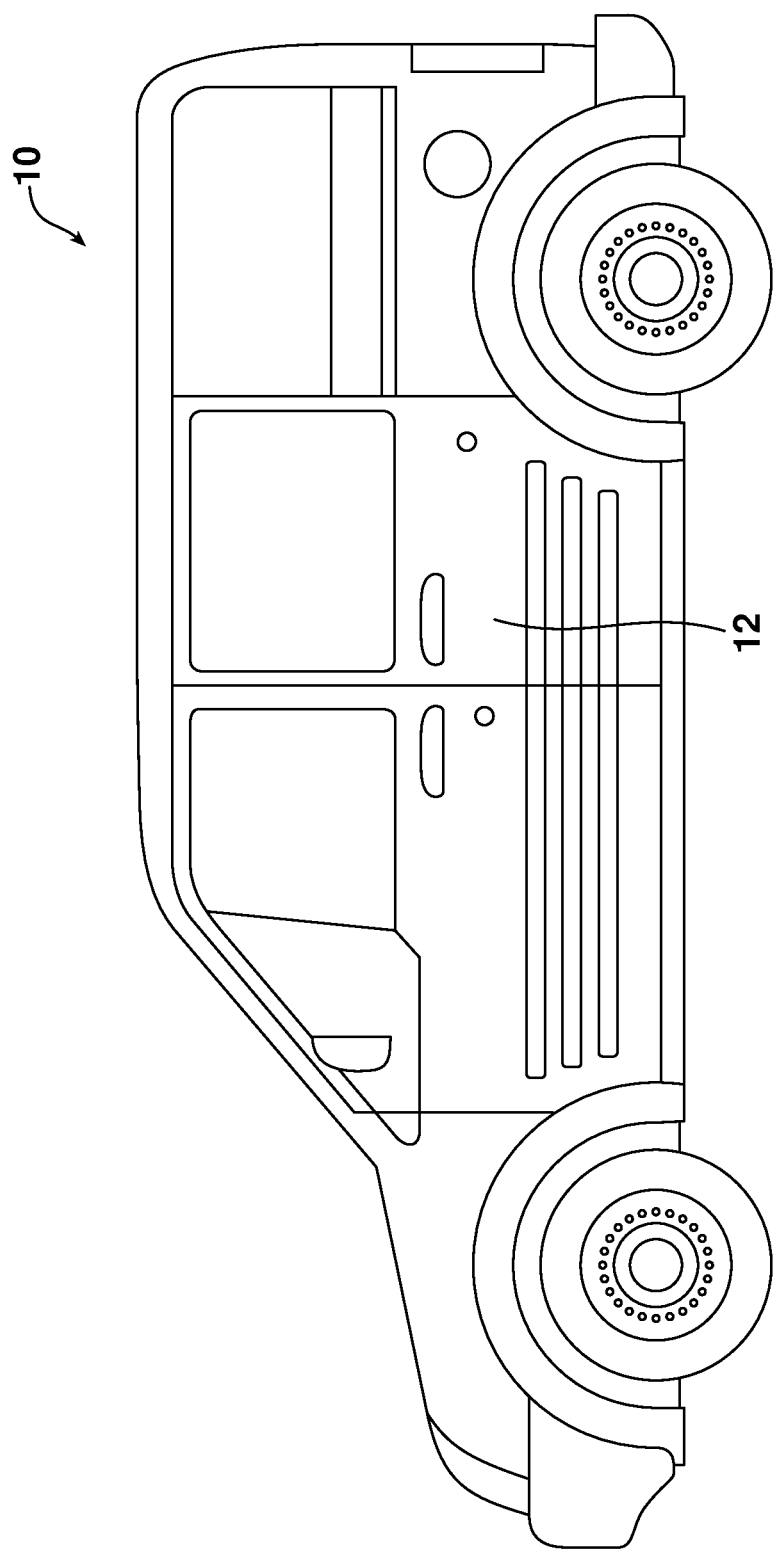
FIG. 1 is a side elevational view of a motor vehicle incorporating a sliding driver's side door that is illustrated in the closed position.
Figure 2:
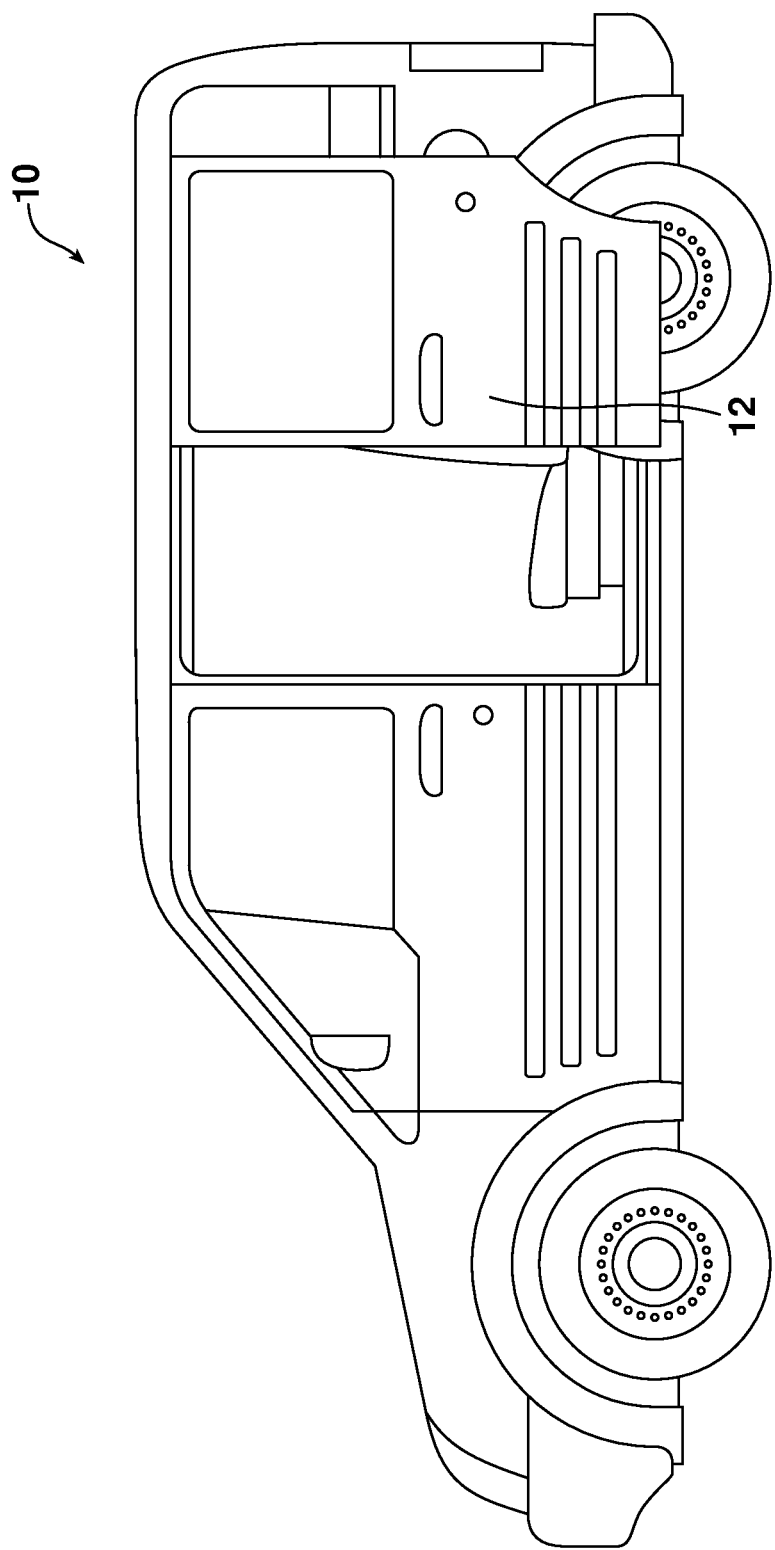
FIG. 2 is a side elevational view similar to FIG. 1 but illustrating the motor vehicle with the driver's side sliding door in the open position.

Reference is now made to FIGS. 1 and 2 illustrating a motor vehicle 10 incorporating a sliding door 12 on the driver's side of the vehicle. FIG. 1 illustrates the sliding door 12 in the closed position. FIG. 2 illustrates the sliding door 12 in the fully open position.

Figure 3:
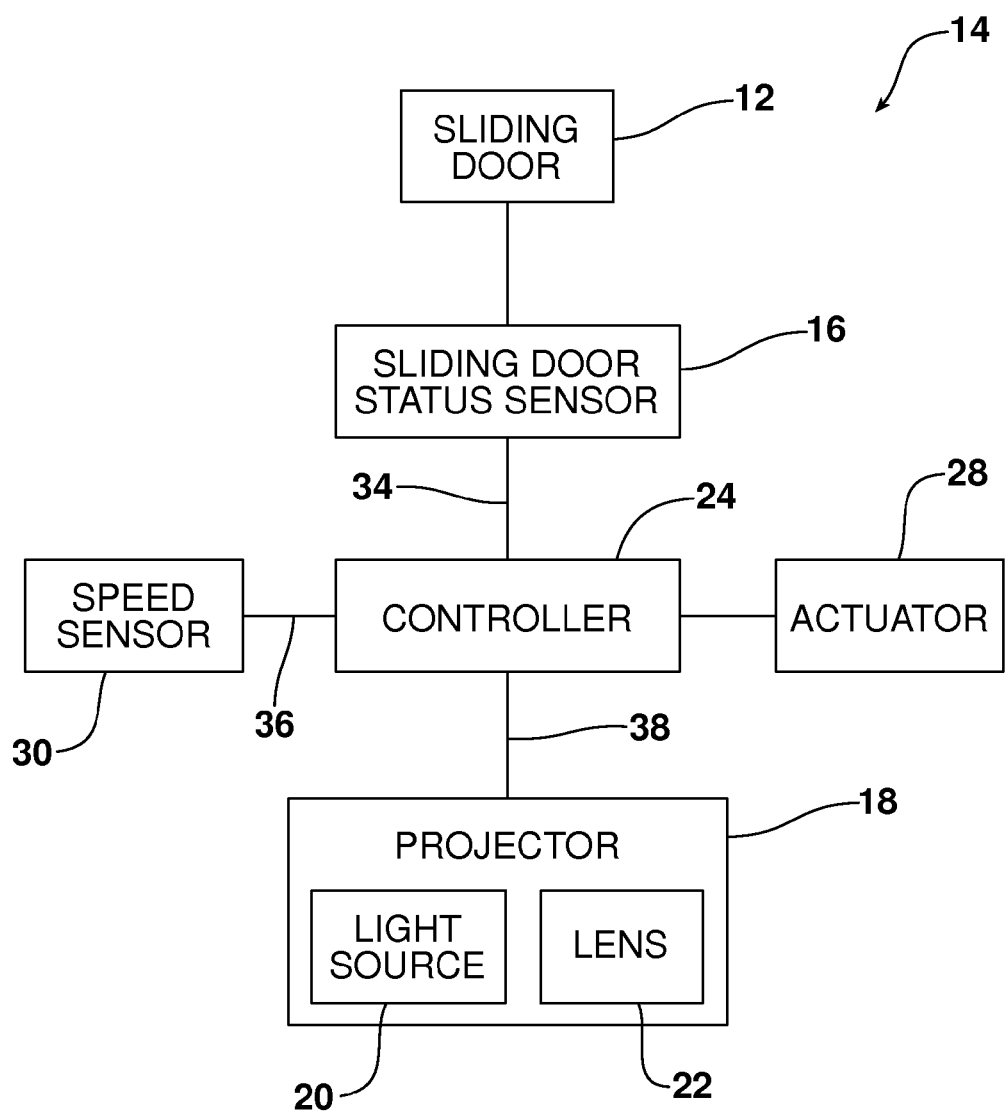
FIG. 3 is a top plan view of the vehicle illustrated in FIG. 2 and clearly showing the projecting of an illuminated warning signal in the form of an icon upon the surface of the pavement beside the open sliding door and outboard in the path of another, oncoming vehicle (not shown).

Reference is now made to FIG. 3 schematically illustrating the exit warning system 14 for a motor vehicle 10, such as illustrated in FIGS. 1 and 2, incorporating a sliding door 12. As illustrated, the warning system 14 includes a sliding door status sensor 16. The sensor 16 monitors the status of the sliding door 12 as it is moved or displaced between the closed and opened positions illustrated in FIGS. 1 and 2. The sensor 16 may take any appropriate form suitable for its intended purpose including, but not limited to a micro switch, a capacitive sensor, sonar, infrared sensor, or any other device capable of monitoring and determining when the sliding door 12 is closed or opened.

The exit warning system 14 also includes a projector 18 which may include, for example, a light source 20 and a lens 22. As will be described in greater detail below, the projector 18 functions to project a warning signal 32 upon the surface of the pavement P beside the open sliding door 12 and outboard in the path of an oncoming vehicle when the sliding door 12 is open. Note such a warning signal 32 in the form of an icon in FIG. 4.

As further illustrated in FIG. 3, the exit warning system 14 also includes a controller 24. Controller 24 may comprise a dedicated microprocessor or electronic control unit (ECU). Such a controller 24 comprises one or more processors, one or more memories and one or more network interfaces that communicate with each other over a communication bus.

In one possible embodiment, the controller 24 comprises a body control module or BCM that may also include a human interface, a GPS/geo locator component, a display device such as a multifunction display with touchscreen capability 26 and a speech processor that all communicate with each other over a communication bus. The BCM 24 performs a number of interior body electrically based functions including, for example, interior locking, remote key entry, interior lighting, exterior lighting, windshield wiper control and the like. In some embodiments the BCM 24 may also function to control entertainment functions (e.g. radio, CD player and communications such as telephone and internet communications over a wireless network). In some embodiments the BCM 24 is connected by a communication bus (not shown) to other control modules that provide one or more of these additional functions.

As further illustrated in FIG. 3, in some embodiments, the exit warning system may incorporate an actuator 28 allowing one to manually control or override operation of the exit warning system 14. Further, in some embodiments, the exit warning system 14 may include a speed sensor 30 that detects the speed of the motor vehicle.

As should be appreciated, the exit warning system 14 operates to alert a driver of a first vehicle to a potential of an individual exiting an open sliding door 12 of a second motor vehicle 10. This is done via a method that may be broadly described as comprising the step of projecting a warning signal 32 onto the pavement P beside the vehicle 10 outside the open sliding door 12 (note FIG. 4). In the illustrated embodiment, that warning signal 32 comprises an icon in the form of a silhouette of an individual walking. Of course it should be appreciated that the warning signal 32 may take other forms including something as simple as an illuminated spot on the pavement to words warning that an individual is about to exit the vehicle as well as to images other than the walking figure illustrated in the drawing figure. Further, it should be appreciated that the warning signal or icon may be an animated image. For purposes of this document, "animated" is broadly interpreted to mean and include (1) the simple flashing of the warning on the pavement, (2) a changing image on the pavement or (3) a constant or changing image changing color. As should be appreciated from viewing FIG. 4, the warning signal 32 is provided on the pavement P laterally adjacent the motor vehicle 10 in the path of another vehicle coming up the road where it can be easily be seen by the driver of the other vehicle who will slow in response to the signal.

As should be appreciated the method may also include detecting the opening of the sliding door by means of the sliding door status sensor 16 before projecting the warning signal 32 onto the pavement P with the projector 18.

Further the method may include confirming that the motor vehicle 10 is stationary by means of the speed sensor 30 before projecting the warning signal 32 onto the pavement P with the projector 18. Thus, the controller 24 monitors signals received along the control lines 34 and 36 from the sliding door status sensor 16 and the speed sensor 30. Upon receiving a control signal from the sliding door status sensor 16 indicating that the sliding door 12 is open and a control signal from the speed sensor 30 indicating that the vehicle is stationary or traveling below a threshold maximum speed, the controller 24 issues a control signal along line 38 to the projector 18 which then projects the warning signal 32 onto the pavement P. As best illustrated in FIGS. 1 and 2, the projector 18 may be provided in various places on the motor vehicle 10 including, for example, on the roof above the open sliding door at the exterior or interior of the motor vehicle. Of course, substantially any other location that is suitable for the projection of the warning signal in the desired location on the pavement P may also be utilized. The lens 22 can ensure that the image is sharp and focused in its projected form upon the pavement P.

The controller 24 periodically or continuously monitors the control lines 34, 36. Once the sliding door 12 is closed as detected by the sensor 16, an appropriate signal is sent by the sensor 16 to the controller 24 indicating door closure. In response, the controller 24 sends a signal along signal line 38 to the projector 18 terminating the projection of the warning signal 32 upon the pavement P. Termination may also take place in response to a signal on signal line 36 from the speed sensor 30 indicating that the vehicle is moving.

Of course, the actuator 28 may be utilized by the vehicle operator to deactivate the warning system 14 altogether or direct the controller 24 to send a control signal along line 38 to the projector 18 and thereby cause the projection of the warning signal 32 whenever desired. In other words, the actuator 28 may be utilized to manually activate and deactivate the warning signal 32.

The foregoing has been presented for purposes of illustration and description. It is not intended to be exhaustive or to limit the embodiments to the precise form disclosed. Obvious modifications and variations are possible in light of the above teachings. For example, a warning light 40 could also be provided at the rear of the open sliding door (see FIG. 4). This light 40 could flash when the door is opened to provide a further alert to an approaching vehicle in addition to the projected image 32. All such modifications and variations are within the scope of the appended claims when interpreted in accordance with the breadth to which they are fairly, legally and equitably entitled.

What is claimed:

1. An exit warning system for a motor vehicle having a sliding door, comprising:
    a sliding door status sensor;
    a speed sensor;
    a projector;
    a warning signal projected by said projector onto pavement laterally adjacent the motor vehicle when the sliding door is open;
    a controller configured to activate said projector to project said warning signal upon receiving a first signal from said sliding door status sensor indicating that the sliding door is open and a second signal from said speed sensor indicating that the vehicle is stationary, wherein said controller is further configured to deactivate said projector upon receiving a third signal from said speed sensor indicating that the motor vehicle is exceeding a threshold ground speed.

2. The system of claim 1, wherein said warning signal is an icon.

3. The system of claim 2, wherein said icon is an animated image.

4. The system of claim 1, further including an actuator connected to said controller for manually activating and deactivating said projector.

5. The system of claim 1, further including a warning light on said sliding door.

6. A method of alerting a driver of a first vehicle to a potential of an individual exiting an open sliding door of a second vehicle, comprising:
   detecting opening of said sliding door;
   projecting a warning signal onto pavement beside the second vehicle outside said open sliding door after detecting opening of said sliding door;
   confirming said second vehicle is stationary before projecting said warning signal onto pavement; and
   terminating the projection of said warning signal onto pavement upon receipt of a signal indicating said second vehicle is moving.

7. The method of claim 6, including using an icon as said warning signal.

8. The method of claim 7, including using an animated icon as said warning signal.

9. The method of claim 6, further including flashing a warning light on said sliding door when it is open.

\* \* \* \* \*

UNITED STATES PATENT AND TRADEMARK OFFICE
CERTIFICATE OF CORRECTION

PATENT NO.         : 9,550,450 B2                                  Page 1 of 1
APPLICATION NO.    : 14/600938
DATED              : January 24, 2017
INVENTOR(S)        : Juan Manuel Galicia Badillo It is certified that error appears in the above-identified patent and that said Letters Patent is hereby corrected as shown below:

In the Claims

Column 4, Line 49, please replace "open;" with --open; and--.

Signed and Sealed this
Eighteenth Day of April, 2017

Michelle K. Lee
*Director of the United States Patent and Trademark Office*